June 30, 1953  E. AMBROISE  2,643,833
EMPENNAGE CONTROL STRUCTURE
Filed Sept. 22, 1949  5 Sheets-Sheet 1

Edmond Ambroise
INVENTOR.

BY Van Deventer & Shively

ATTORNEYS

Edmond Ambroise
INVENTOR.

BY
*Van Devanter & Shively*
ATTORNEYS

June 30, 1953 E. AMBROISE 2,643,833
EMPENNAGE CONTROL STRUCTURE
Filed Sept. 22, 1949 5 Sheets-Sheet 3
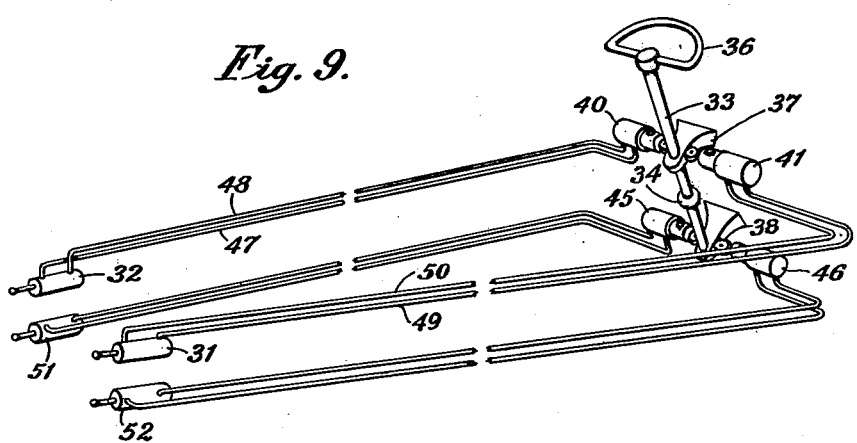
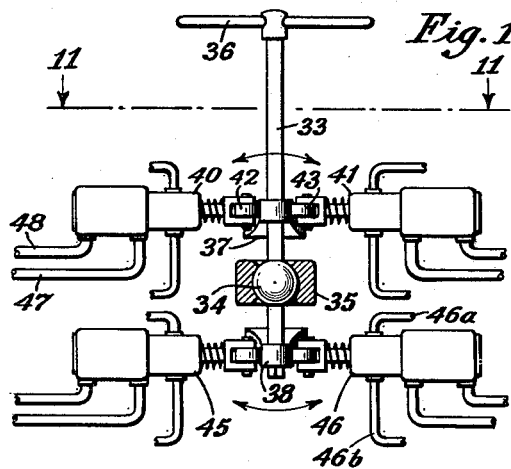
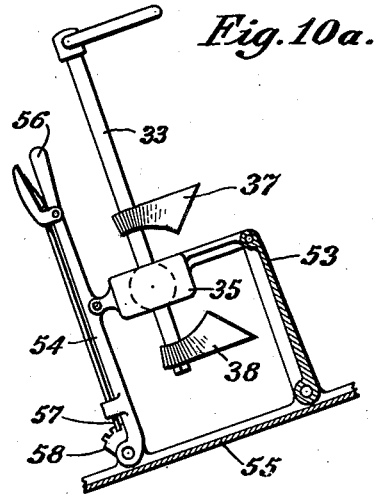
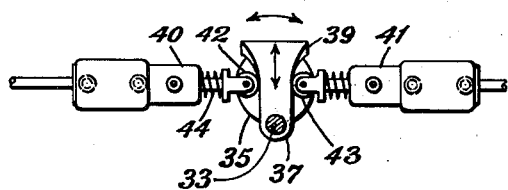
Edmond Ambroise
INVENTOR.
BY Van Deventer & Shively
ATTORNEYS June 30, 1953 E. AMBROISE 2,643,833
EMPENNAGE CONTROL STRUCTURE
Filed Sept. 22, 1949 5 Sheets-Sheet 4

*Edmond Ambroise*
INVENTOR.

BY *Van Deventer & Shively*
ATTORNEYS

June 30, 1953 — E. AMBROISE — 2,643,833
EMPENNAGE CONTROL STRUCTURE
Filed Sept. 22, 1949 — 5 Sheets-Sheet 5

Edmond Ambroise
INVENTOR.

BY Van Devanter & Shively
ATTORNEYS

Patented June 30, 1953

2,643,833

UNITED STATES PATENT OFFICE 2,643,833

EMPENNAGE CONTROL STRUCTURE

Edmond Ambroise, Rennes, France

Application September 22, 1949, Serial No. 117,241

4 Claims. (Cl. 244—83)

The present invention pertains to improvements in empennage control structure.

An object of the invention is to provide improved means for steering, stabilizing and otherwise controlling the three-dimensional passage of vehicles through fluid media.

A further object is to provide a single structural combination applicable to airplanes and adapted to perform selectively the functions of vertical steering, horizontal steering, and lateral stabilization.

Another object is to provide a structure of the above type employing hinged normally vertical upper and lower rudders of split construction, the individual halves of both rudders being adapted to be swung outward to any desired degree in selective combination.

A further object is to provide control apparatus of the above nature by which the necessity for separate horizontal rudder, vertical rudder, ailerons and wing flaps is dispensed with.

A further object is to provide a structure of the above nature which may be used in combination with existing types of control structures, being adapted to take over the functions of the latter in case of injury thereto.

A still further object is to provide apparatus of the above nature especially adapted to the control of flying wing or tail-less types of planes, especially for high speed operation.

Further related objects and advantages will become obvious to those skilled in the art during the course of the following description in connection with the accompanying drawings, in which:

Figure 9 is a diagrammatic perspective illustration of a typical hydraulic actuating system for the device;

Figure 10 is a detail rear elevation of the manual control means for the same;

Figure 10a is a side elevation, partly in section, showing the mounting of the manual control apparatus;

Figure 11 is a sectional view of the same on the lines 11—11, Figure 10;

Figure 1:
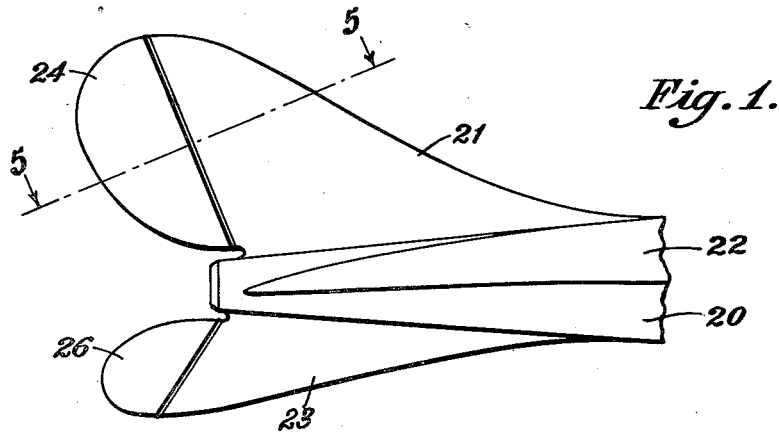
Figure 1 is a side view of a typical embodiment of the combination rudder structure.

Referring to Figure 1, the numeral 20 indicates the rear central portion of a combined wing and fuselage such as is used in "flying wing" types of airplanes. A vertical stationary fin structure 21 extends upward above the rear edge of the wing 22, while a second vertical fin 23 of similar structure extends downward below the wing. A split rudder comprising right and left fins 24 and 25, is hinged to the rear of the stationary fin 21, while the lower stationary fin 23 similarly carries hinged right and left rudder-fins 26 and 27, Figures 1 and 13. The hinge axes of both upper and lower rudder structures are inclined rearwardly as shown, this arrangement having been determined as providing maximum efficiency in operation.

Since the general structure and operation of the upper and lower rudders are the same, the following description of the upper combination will be understood to be typical of both.

Figure 3:
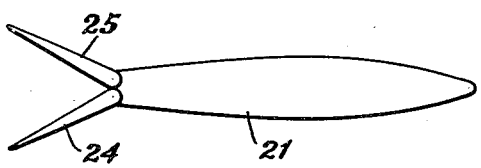
Figure 3 is a view of the same showing both upper rudder fins in open position.
Figure 4:
Figure 4 shows one fin in open and one in closed position.
Figure 5:
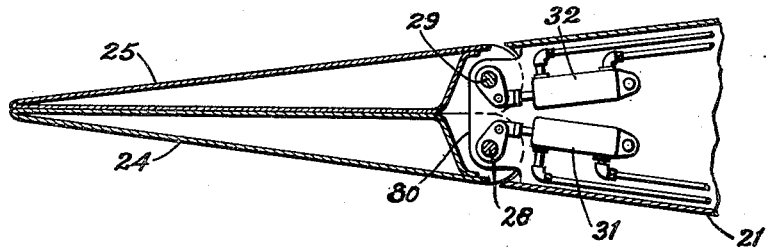
Figure 5 is a sectional view on the lines 5—5, Figure 1, illustrating attachment of hydraulic actuating means.

Referring to Figure 5, the upper rudder fins 24 and 25 are secured to rods 28 and 29 pivotally mounted in brackets or rearward extensions 30 of the stationary or fixed fin 21, and are adapted to be swung outward independently of each other as illustrated in Figures 3 and 4. Any suitable actuating means may be provided for the rudder fins, a typical means comprising hydraulic cylinders 31 and 32, Figure 5.

Figure 2:
Figure 2 is an inclined top view of the upper rudder structure in closed position.

It will be noted that when both upper rudder fins 24 and 25 are in normal position, they fit closely together, forming a continuously streamlined extension and termination of the fin structure, as shown in Figure 2. If any single rudder fin such as fin 24 is thrown outward as illustrated in Figure 4, unbalanced drag is introduced on one side which tends to turn the plane. Since the total rudder structure includes four fins, namely fins 24 and 25 above the wing-level and fins 26 and 27 below the wing, the above mentioned turning effect may be applied by the rudder fins in various selective combinations to provide vertical steering, horizontal steering and stabilizing control.

Typical combinations of the above nature are illustrated in Figures 12 to 16, which diagrammatically illustrate the wing and rudder structures viewed from the front under different control conditions. When both upper rudder fins 24 and 25 are thrown outward and the lower fins 26 and 27 remain retracted as in Figure 12, it will be evident that the drag is balanced in the horizontal plane, but unbalanced in the vertical plane, since both fins 24 and 25 are above the plane of flight of the wing 22, with the result that the plane is nosed upward for climbing.

Figure 13:
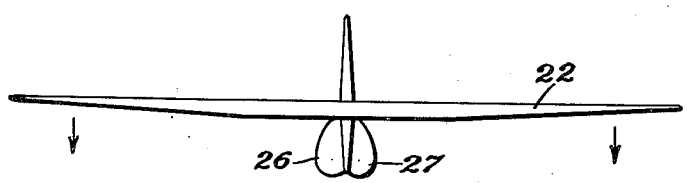
Figure 13 is a similar view illustrating diving position.
Figure 14:
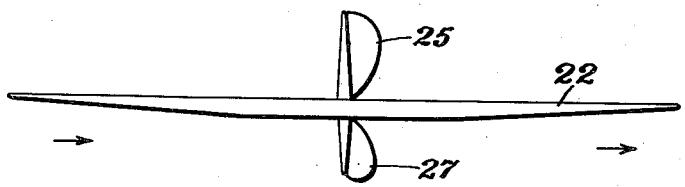
Figure 14 is a similar view illustrating horizontal steering.

If, on the other hand, the upper fins 24 and 25 are retracted, and both lower fins 26 and 27 are thrown outward as in Figure 13, a horizontally balanced drag is introduced below the line of flight, which noses the plane downward as in diving. Throwing both upper and lower fins outward on the same side, for example fins 25 and 27 in Figure 14, provides for steering in the horizontal plane.

Figure 15:
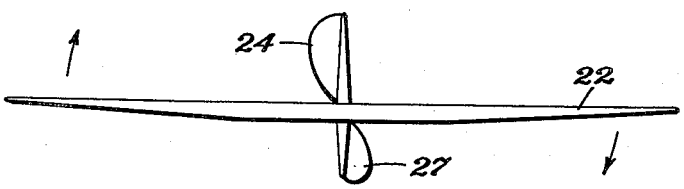
Figure 15 is a similar view illustrating the operation in providing for lateral stabilization.
Figure 16:
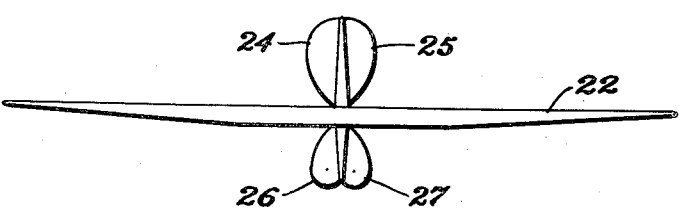
Figure 16 is a similar view illustrating the position of the parts in aerodynamic braking.

Throwing one upper fin and the opposite lower fin outward, as illustrated in Figure 15, imparts a lateral turning movement to the plane about the latter's longitudinal axis, thus stabilizing the plane laterally after the manner of ailerons. For slowing the plane for landing, all four fins 24, 25, 26 and 27 may be thrown outward to act as an aerodynamic brake as shown in Figure 16.

The above-described functions have been illustrated separately in Figures 12 to 16, but it will be obvious that in operation they are combined in various degrees as required. Figures 9, 10 and 11 illustrate means by which control of such combined operation may be carried out by the pilot by manipulation of a single control member.

Referring to Figures 9 to 11, the numeral 33 designates a steering post having thereon a spherical portion 34 supported in a spherical bearing member 35 forming a ball and socket mounting which allows the post to be rotated or to be swung in any direction. The top of the post 33 carries a semi-circular steering handle or half-wheel 36.

A pair of arcuate shoes 37 and 38 are secured to the post 33 at equal distances above and below the ball 34, these shoes extending forwardly when the wheel 36 is in position for straight flight. The rearward halves of the shoes 37 and 38 have parallel sides as illustrated in Figure 11, while the forward portions 39 are flared outwardly. Two inwardly directed hydraulic control units 40 and 41 have plunger rollers 42 and 43 pressed against the sides of the upper shoe 37 by means of compression springs 44. A similar pair of units 45 and 46 engage the sides of the lower shoe 38.

The control units 40, 41, 45 and 46 are of the valve and follower-cylinder type connected by tubes such as 46a and 46b with the usual hydraulic pressure supply source. Since the internal structure and operation of such control units and supply systems are well known in the art and are not per se an essential feature of the present invention, further detail description is unnecessary herein.

Referring to diagrammatic Figure 9, the control unit 40 is connected by tubes 47 and 48 with the hydraulic actuating cylinder 32 of the upper left rudder fin 25, Figure 5. Similarly the unit 41 is connected through tubes 49 and 50 with upper right actuating cylinder 31. In the same manner the units 45 and 46 are hydraulically connected respectively to cylinders 51 and 52 adapted to control the lower left and lower right rudder fins 26 and 27.

Assuming the post 33 to be in central or normal position for straight level flight, the relationships of both upper and lower shoes 37 and 38 and their respective hydraulic control units are as illustrated in Figures 9, 10 and 11. If the wheel 36 and post 33 are turned to the left, the shoes 37 and 38 actuate the units 40 and 45, thus throwing out both upper and lower left rudder fins 25 and 27 as in Figure 14. If the wheel is turned to the right, the shoes 37 and 38 actuate th control units 41 and 46 in the same manner, thus throwing outward both right rudder fins 24 and 26.

To direct the plane upward, the post 33 may be rocked rearwardly toward the operator. This causes the flared forward portion 39 of the upper shoe 37 to actuate both control units 40 and 41, throwing outward both upper rudder fins 25 and 24 as in Figure 12. Similarly, if the post 33 is rocked forward, the flared lower shoe 38 actuates both units 45 and 46 to spread both lower rudder fins 26 and 27, Figure 13.

For lateral stabilization the operator rocks the post 33 either to the right or left. When the post is rocked to the right the shoe 37 actuates the unit 41 while the lower shoe 38 actuates the unit 45, throwing out the upper right and lower left fins 24 and 27, Figure 15, to raise the right and lower the left wing tips. Leftward rocking of the post 33 similarly operates to throw outward the upper left and lower right rudder fins 25 and 26.

From the foregoing description it will be evident that all the control functions illustrated in Figures 12 to 15 may be performed by manipulation of the single member 36. It will also be evident that while these functions have been described separately for purposes of clarity, in practice they are performed in various modifying combinations as required, this result being obtained by the appropriately combined lateral rocking, longitudinal rocking, and rotary motions of the control wheel 36.

The spherical support 35 is horizontally pivoted to a wide forward frame 53 and lever 54, these members being horizontally pivoted to a support 55 forming part of the rigid plane structure. The rear lever 54 has a handle 56, and is provided with a spring pressed latch 57 engaging a notched quadrant 58 which normally holds the steering assembly in operating position as described. When it is desired to open all four rudder fins as shown in Figure 16, the latch 57 may be released and the lever 54 is pulled rearwardly. This causes both shoes 37 and 38 to be shifted toward the rear so as to actuate all four control units 40, 41, 45 and 46, thus throwing outward all four tail rudder fins as required. The quadrant 58 is provided with a plurality of notches, so that the apparatus may be latched in place with any required degree of extension of the rudder fins, and when so latched the steering apparatus is still operable to modify the relative positions of the various fins in the manner previously set forth.

Figure 17:
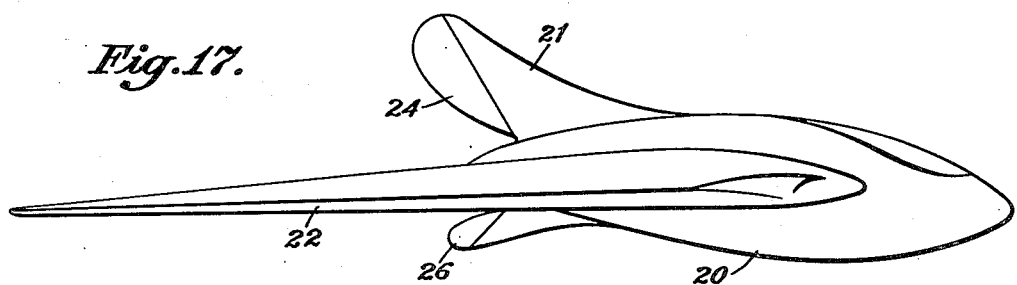
Figure 17 is a side view of a small tailless or wing type plane embodying the invention.

In actual flight, particularly at very high speeds, for which the present invention is well adapted, the outward movements of the rudder fins necessary to produce the various control effects are normally very small, these movements having been exaggerated in the drawings for purposes of clarity. At high speeds near the "Sound Barrier" speed, ordinary ailerons, elevators and stabilizers fitted to the trailing edges of the swept-back wings of tailless planes lose a high percentage of their efficiency, besides interfering with the uniform airflow past the wings. In the present invention the upper rudder combination 24, 25 operates well above the trailing edge of the wing 22 as clearly shown in Figure 1 and in Figure 17, which latter figure shows the split or "crocodile-jaw" rudders applied to a jet-propelled tailless fighter type plane. Similarly, the lower rudder combination 26, 27 operates below the level of the wing's trailing edge. Thus these devices operate at levels substantially clear of the air-stream of the wing 22, preserving the air-stream's uniformity with consequent maximum wing performance. At the same time the highest efficiency in action of the rudders themselves results from their operation in air relatively undisturbed by the wing.

A further advantage of the device applied to tailless planes lies in the elimination of wing-tip flaps. In landing and taking off with such planes, it is customary to lower what may be termed "hyper-lift" flaps on the trailing edges of the wing. These flaps, used alone, impose a pitching movement on the plane. To counteract this movement the usual procedure is to raise the wing-tip flaps, either automatically or by manual control. However, when the latter flaps are raised the air-flow on the wing-tips is spoiled, with a consequent serious loss in lift.

With the present invention, when the hyper-lift flaps are employed, the pitching movement may be counteracted by slightly opening the upper crocodile-jaw rudder combination 24, 25. The slight increase in drag is insignificant in proportion to the undisturbed preservation of lift.

Figure 18:
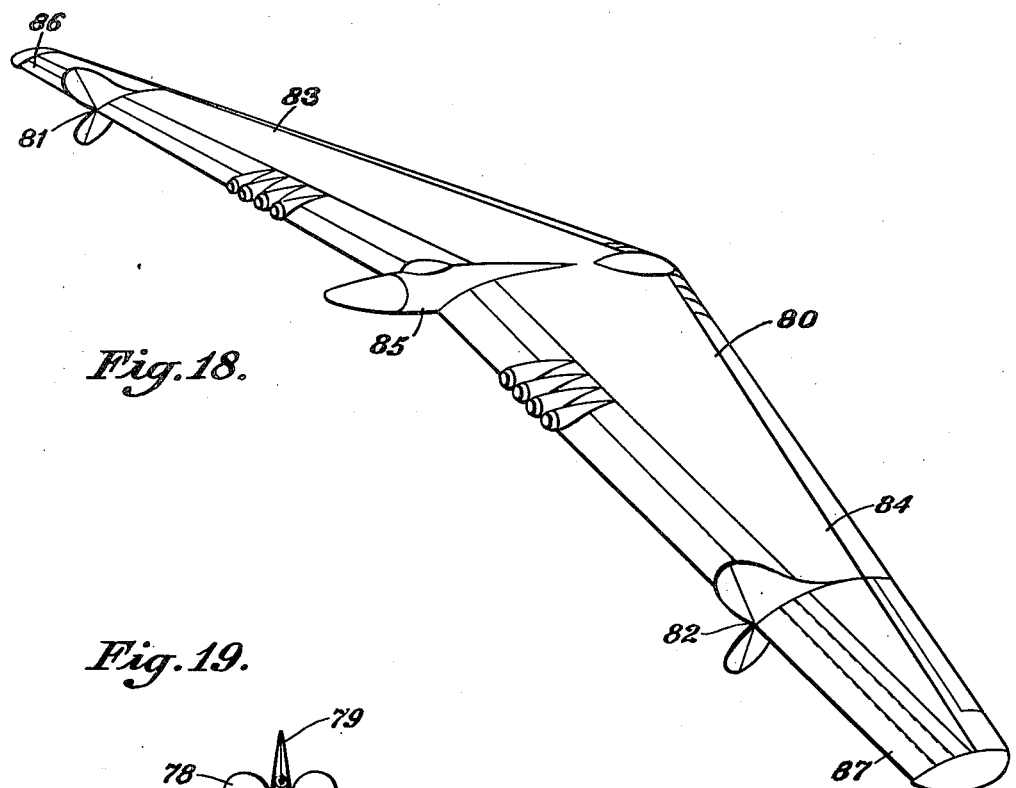
Figure 18 is a perspective view of a large flying-wing type of plane equipped with the apparatus.

In the case of very large planes such as the flying-wing bomber 80, Figure 18, two sets 81 and 82 of vertical split or crocodile-jaw rudders may be advantageously employed, these devices being disposed well outward laterally along the wing portions 83 and 84 from the central control cabin 85. These rudder combinations, in addition to performing the usual functions of vertical stabilizer fins, are operable jointly to carry out the various control functions in the manner and with the advantages previously set forth. If desired, for alternative or additional control purposes, the structural combination may include horizontally pivoted split ailerons or horizontal fin combinations 86 and 87 of the same general type of structure as the crocodile rudders except for the horizontal pivoting.

It will be understood that the hydraulic actuating system shown in Figures 9 to 11 has been described as manually controllable by way of an example, it being obvious that the invention is adapted also to automatic control by means of such devices as the automatic or robot pilots well known in the art. It is also obvious that the actuation of the crocodile-jaw rudders may be accomplished by various means other than hydraulic, such as cable combinations or pneumatic systems. Independent controls for the various rudder fins may of course be provided instead of integrated controls if desired.

Figure 6:
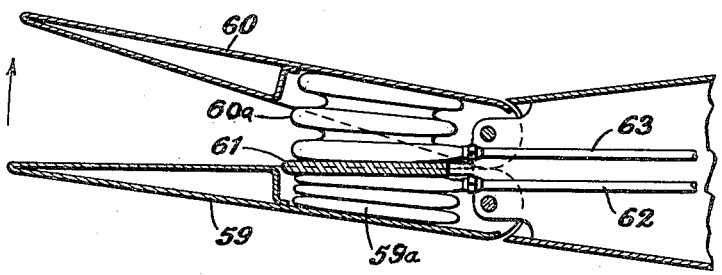
Figure 6 illustrates an alternative type of actuating means including pneumatically expansible bags.

Figure 6 illustrates a rudder structure adapted to actuation by compressed air and vacuum. This embodiment employs a pair of expansible air bags or bellows members 59a and 60a disposed inside the fins 59 and 60 and bearing against a stationary central wall 61. Admission of air under pressure or withdrawal thereof under vacuum through suitable tubes 62, 63 either by manual or automatic control, expands or allows contraction of the members 59a and 60a, moving the fins 59 and 60 outward or inward as required.

Figure 7:
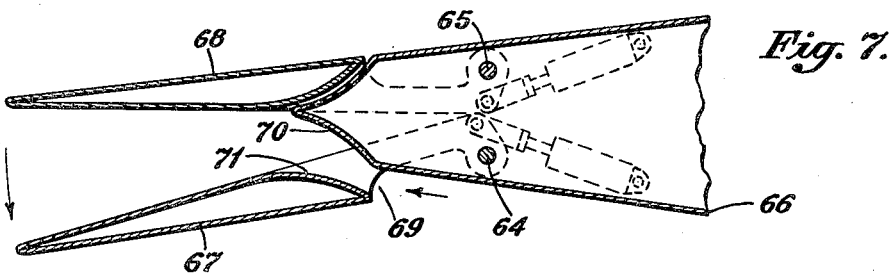
Figure 7 illustrates a modified fin structure adapted to provide a slot effect.

In some types of service it may be desired to provide a slot effect as the rudder fins open. Figure 7 illustrates a suitable form of the device for this purpose. The hinge rods 64 and 65 are located in the stationary fin 66 well forward of the rudder fins 67 and 68. When either fin, for example 67, is swung outward as shown, a throat or slot 69 is opened between the streamlined rear 70 of the stationary fin 66 and the streamlined leading interior portion 71 of the rudder fin. It will of course be understood this combination is typical of both the upper and lower split rudder structures.

Figure 8:
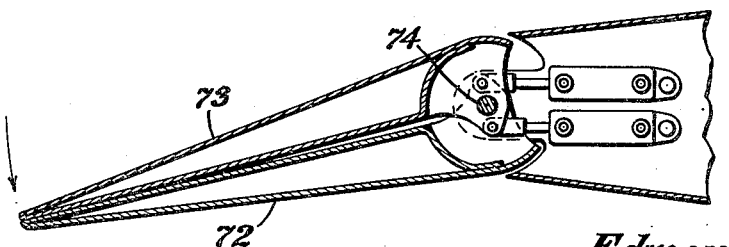
Figure 8 shows a modified form of mounting whereby both fins may be swung past center together after the manner of a standard rudder.
Figure 12:
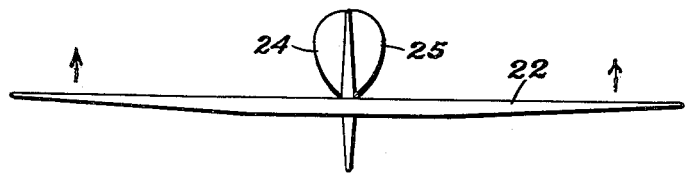
Figure 12 is a diagrammatic front view of a plane structure embodying the device and illustrating the position of the rudder fins for climbing.

In Figure 8 the right and left rudder fins 72 and 73, instead of being swung on separate pivots as in Figures 5, 6 and 7, are pivoted on a common center 74. This permits both fins to be swung to either side as a unit, if desired, after the manner of an ordinary rudder. An example of the advantageous use of this embodiment is in planes equipped with the usual horizontal stabilizer, horizontal rudder and ailerons.

Figure 19:
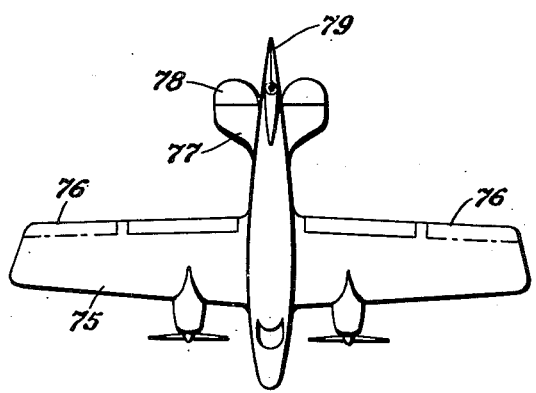
Figure 19 shows the device applied to an ordinary tail type plane in combination with the usual elevator and ailerons.

Figure 19 illustrates a plane 75, having ailerons 76, horizontal stabilizer 77 and horizontal rudder 78, but having the vertical rudder 79 embodying the split upper and lower structure of the present invention.

Such a plane, for example a war plane, may be operated normally under control of the various above noted devices in the usual way, the structure 79 functioning as an ordinary vertical rudder. In case the ailerons 76, horizontal stabilizer 77 and/or the horizontal rudder 78 should be shot away or otherwise disabled, the crocodile-jar rudder structure 79 may be actuated in the manner illustrated in Figures 12 to 16 to take over control to whatever extent may be necessary. Thus it will be seen that the present invention, in addition to providing a primary control means of improved simplicity and efficiency, is also adapted to the provision of two alternatively operable control systems with obviously great advantage over prior structures in flight safety.

The invention has been set forth primarily as applied to airplanes as a principal object, but the same general structure and operating principle in fluid media may be employed in other devices such as guided missiles and submarines. Thus the invention is not limited to the exact preferred forms illustrated, as various modifications may obviously be made without departing from the scope of the appended claims.

What is claimed is:

1. In an airplane, in combination, a wing structure, a central longitudinal body attached to said wing structure, a vertical split rudder attached to the rear of said body above the plane of said wing structure, a second vertical split rudder attached to the rear of said body below the plane of said wing structure and underlying said first rudder, each of said split rudders comprising right and left normally engaged fins, a single manually operable control member movably attached to said body, individual moving means attached to each of said four fins and adapted to swing the same outward, all said moving means being operatively connected to said control member, and means on said control member and operable by selective movements thereof to simultaneously actuate any two of said moving means, whereby said selective movement of said single control member may effect outward movement of any two of said four fins in combination.

2. The combination claimed in claim 1 including rigid vertical fin structures on said body and extending above and below the plane of said wing structure ahead of said split rudders, said fins of said split rudders being articulated to said respective rigid fin structures, and including manual means to alter the relative actuating engagement between said actuating means and said moving means whereby said actuating means may actuate all said moving means simultaneously.

3. In an airplane, in combination, a wing structure, a body portion centrally disposed in said wing structure, a normally vertical split rudder attached to said body portion above the plane of said wing structure, a second normally vertical split rudder attached to said body portion below the plane of said wing structure, each of said split rudders comprising right and left normally engaged fins, individual actuating means to swing each of said fins outward, and common means operatively connected to all said actuating means and adapted to selectively control said actuating means for swinging said fins outward in selective combination comprising any two of said fins or all said fins.

4. In an airplane control device, in combination, a support comprising a body portion of an airplane, vertical split rudder attached to and extending upward from said support, a second vertical split rudder attached to and extending downward from said support below said first split rudder, each of said split rudders comprising normally engaged right and left fins, individual means to swing each of said fins outward, and common control means operatively connected to all said swinging means and adapted to selectively actuate the same to swing said fins outward in selective combination comprising any two or all of said fins.

EDMOND AMBROISE.

References Cited in the file of this patent

UNITED STATES PATENTS

| Number | Name | Date |
|---|---|---|
| 1,160,021 | Watson | Nov. 9, 1915 |
| 1,935,004 | Winther | Nov. 14, 1933 |
| 1,974,407 | Barnhart | Sept. 25, 1934 |
| 2,347,230 | Zuck | Apr. 25, 1944 |
| 2,390,939 | Huff | Dec. 11, 1945 |
| 2,533,702 | Weaver | Dec. 12, 1950 |

FOREIGN PATENTS

| Number | Country | Date |
|---|---|---|
| 408,550 | France | Jan. 27, 1910 |